United States Patent
Amemiya et al.

(10) Patent No.: US 7,191,283 B2
(45) Date of Patent: Mar. 13, 2007

(54) GROUPING OF STORAGE MEDIA BASED ON PARAMETERS ASSOCIATED WITH THE STORAGE MEDIA

(75) Inventors: Yasuo Amemiya, Hartsdale, NY (US); Timothy J. Chainer, Putnam Valley, NY (US); Steven W. Depp, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 312 days.

(21) Appl. No.: 10/645,129

(22) Filed: Aug. 21, 2003

(65) Prior Publication Data

US 2005/0044313 A1 Feb. 24, 2005

(51) Int. Cl.
*G06F 13/10* (2006.01)
(52) U.S. Cl. ..................................................... 711/114
(58) Field of Classification Search ................. 711/114
See application file for complete search history.

(56) References Cited

U.S. PATENT DOCUMENTS

| | | | |
|---|---|---|---|
| 5,301,297 A | 4/1994 | Menon et al. ............... 295/425 |
| 5,727,144 A | 3/1998 | Brady et al. ............ 385/182.04 |
| 5,822,782 A * | 10/1998 | Humlicek et al. ........... 711/170 |
| 6,223,252 B1 * | 4/2001 | Bandera et al. .............. 711/114 |
| 2005/0182992 A1 * | 8/2005 | Land et al. .................. 714/701 |
| 2005/0193167 A1 * | 9/2005 | Eguchi et al. ............... 711/114 |

OTHER PUBLICATIONS

"Self-Monitoring Analysis and Reporting Technology (SMART)," Charles M. Keziorok, The PC Guide (http://www.PCGuide.com), Site Version: 2.2.0—Version Date: Apr. 17, 2001 (Available as website or CD-ROM (which can be purchased at www.PCGuide.com).

* cited by examiner

*Primary Examiner*—Kevin L. Ellis
(74) *Attorney, Agent, or Firm*—Casey P. August; Blanche E. Schiller, Esq.; Heslin Rothenberg Farley & Mesiti P.C.

(57) ABSTRACT

Storage media of a storage system are grouped into one or more groups based upon parameters associated with the storage media. Various parameters may be taken into consideration depending upon the criteria selected for the grouping. At least one grouping criterion is selected, and based on the grouping criterion, one or more parameters are measured. Then, using the measured data, a plurality of storage media are placed into one or more groups. The groups may then be used to form Redundant Array of Independent Disks (RAID) arrays employed in the storage system.

28 Claims, 8 Drawing Sheets fig. 1A fig. 1B fig. 2 fig. 3 fig. 4 fig. 5 fig. 6 fig. 7 fig. 8

GROUPING OF STORAGE MEDIA BASED ON PARAMETERS ASSOCIATED WITH THE STORAGE MEDIA

CROSS-REFERENCE TO RELATED APPLICATIONS

This application contains subject matter which is related to the subject matter of the following application, which is assigned to the same assignee as this application. The below listed application is hereby incorporated herein by reference in its entirety:

"AUTOMATIC COLLECTION AND DISSEMINATION OF PRODUCT USAGE INFORMATION," Chainer et al., Ser. No. 10/645,128, filed Aug. 21, 2003.

TECHNICAL FIELD

This invention relates, in general, to storage systems, and in particular, to selectively grouping storage media of a storage system to optimize the storage system.

BACKGROUND OF THE INVENTION

Storage systems are an important component of many computing and data processing environments. They provide a broad range of storage capabilities, and include, for instance, storage devices, as well as hardware and software, to provide a reliable and high performing storage system. The evolution of storage systems is described in an article entitled "The Evolution of Storage Systems," by R. J. T. Morris and B. J. Treskowski, IBM Systems Journal, Vol. 42, No. 2, 2003, which is hereby incorporated herein by reference in its entirety. Storage systems are used both in externally attached storage, as well as in embedded systems. A single storage system can include a hundred or more storage devices, such as hard disk drives.

With the development of the RAID (Redundant Array of Independent Disks) technology, the disk drives are configured into one or more logical arrays (e.g., RAID arrays) that provide data storage solutions with a certain amount of reliability and/or performance. A RAID array is formed by splitting or combining physical arrays. A physical array is one or more physical drives randomly grouped to form a physical array. Typically, a RAID configuration uses one physical array, but complex configurations can have two or more physical arrays. Similarly, typically, one logical array corresponds to one physical array. However, a logical array may include multiple physical arrays to allow multiple RAID levels. One or more logical drives are formed from one logical array. These appear to the operating system as regular disk volumes with the RAID controller managing the arrays.

In a RAID system, the data is split and stored across multiple disk drives. This is referred to as striping. Since a RAID array includes multiple drives, performance can be improved by using the drives in parallel. This can be accomplished by splitting the data onto the multiple drives in the array and then using the drives to read back a file when needed. Striping can be done at the byte level or in blocks.

Striping allows RAID arrays to improve performance by splitting up files into pieces and distributing them to multiple hard disks. Most striping implementations allow the creator of the array control over two parameters, which include the stripe width and stripe size. The stripe width refers to the number of parallel stripes that can be written to or read from simultaneously. The stripe width is equal to the number of disks in the array. Read and write performance of a striped array increases as width increases, since adding drives to the array increases the parallelism of the array, allowing access to more drives simultaneously.

The stripe size of the array refers to the size of the stripes written to each disk. As stripe size is decreased, files are broken into smaller pieces. This increases the number of drives storing the data of a file, theoretically increasing transfer performance, but decreasing positioning performance.

Since striping involves no redundancy, there is no data protection in the event of a disk failure. Thus, a data redundancy technique, referred to as parity, may be used with striping to provide data protection. The disadvantages of striping with parity is that the parity bits have to be computed which takes computing power. Also, recovering from a lost drive under parity requires the missing data to be rebuilt. Parity calculates an extra redundant piece of data from the "N" pieces of data which is stored. The "N" pieces of data are typically the blocks or bytes distributed across the drives in the array. The "N+1" pieces of data are stored on "N+1" drives. If one of the pieces of data is lost, the "N+1" pieces of data can be recreated from the "N" that remain, independent of which piece is lost. The parity information is either stored on a separate drive or is mixed with the data across the drives in the array. Parity protects data against any single drive in the array failing without requiring the 100% overhead of mirroring, another redundancy technique.

In a RAID system using mirroring, all the data in the system is written simultaneous to a plurality of (e.g., two) hard disks, instead of one. Mirroring provides 100% data redundancy and provides protection against the failure of either of the disks containing the duplicated data. Mirroring provides fast recovery from a disk failure, since the data is on the second drive and is ready to use if the first one fails.

Currently, in order to configure a RAID array, disk drives are randomly placed in physical arrays, which are ultimately used to form RAID arrays. Thus, an array can be formed of a wide mixture of high performing and low performing drives, which affects the overall performance of the storage system. For example, even an array that includes identical drives of the same manufacturer, same model number, etc. can have a variety of high and low performing drives due to the wide range of internal parameters which affect performance and reliability. Thus, a need exists for an enhanced technique to configure the physical arrays. A further need exists for an enhanced technique to configure RAID arrays.

SUMMARY OF THE INVENTION

The shortcomings of the prior art are overcome and additional advantages are provided through the provision of a method of grouping storage media. The method includes, for instance, obtaining parameter information for one or more parameters associated with a plurality of storage media; and grouping at least a portion of storage media of the plurality of storage media into one or more groups of storage media based on at least one parameter of the one or more parameters.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, storage media of a storage system are grouped into one or more groups of media based on one or more parameters associated with the media. As one example, the storage media includes storage devices (e.g., disk drives), and a group of devices is used to create one or more logical arrays, such as Redundant Array of Independent Disks (RAID) arrays. As a further example, the storage media includes surfaces of storage devices, and a group of surfaces is used to create one or more logical arrays (e.g., RAID arrays).

The fundamental structure of a RAID array is a physical array of storage media, such as storage devices (e.g., disk drives). The number of devices in the physical array and the data format of sharing the data between the devices determines a RAID level. Each RAID level defines a different way to spread data across multiple devices. This usually includes a compromise between cost and speed. Various RAID levels are described below; however, it will be understood by those skilled in the art that there are many other possible levels of RAID arrays.

1. RAID Level 0—RAID Level 0 provides no redundancy. RAID Level 0 splits or stripes the data across drives, resulting in higher data throughput. Since no redundant information is stored, performance is very good, but the failure of any device in the array results in complete data loss. Level 0 is used to increase device performance.
2. RAID Level 1—RAID Level 1 is usually referred to as mirroring. A Level 1 array provides redundancy by duplicating all the data from one device on a second device, so that if either device fails, no data is lost. This is a good entry-level redundant system. The downside of this type of system is that the cost per megabyte of device storage is twice that of a single device, since two drives are needed to store the same data.
3. RAID Level 3—RAID Level 3 stripes data at a byte level across several devices, with parity stored on one device. Byte level striping employs hardware support for good performance. If one disk fails, it is possible to rebuild the complete data set so that no data is lost. If more than one device fails, the stored data is lost. The cost per megabyte is lower then RAID Level 1, but the performance is lower than RAID Level 5.
4. RAID Level 5—RAID Level 5 stripes data at a block level across several drives and distributes parity among the devices. No single device is devoted to parity. This can speed small writes in multi-processing systems. However, since parity is distributed on each device, read performance tends to be slower than other RAID types. If one device fails, it is possible to rebuild the complete data set, so that no data is lost. If more than one device fails, all the stored data is lost. This is a relatively low cost per megabyte technique, while still retaining redundancy.
5. RAID 0+1 or RAID 10—RAID 0+1 or RAID 10 is a combination of RAID levels that utilizes multiple RAID 1 (mirrored) sets into a single array. Data is striped across all mirrored sets. RAID 10 utilizes several devices to stripe data to increase performance and then makes a copy of the striped devices to provide redundancy. Any device can fail and no data is lost, as long as the mirror of that device is still operational. The mirrored devices eliminate the overhead and delay of parity. This level of array offers high data transfer advantages of striped arrays and increased data accessibility. System performance during a device rebuild is also better than that of parity based arrays, since data does not need to be regenerated from parity information, but is copied from the other mirrored device.
6. RAID 0+5 or RAID 50—RAID 0+5 or RAID 50 is a combination of RAID levels that utilizes multiple RAID 5 sets striped in a single array. In a RAID 50 array, a single device failure can occur in each of the RAID 5 sides without any loss of data on the entire array. If, however, more than one device is lost in any of the RAID 5 arrays, all the data in the array is lost. If the number of devices increases in an array, so does the possibility of a single device failure. Although there is an increase write performance in RAID 50, once a device fails and reconstruction takes place, there is a noticeable decrease in performance, data/program access is slower, and transfer speeds on the array are effected.

Additional details regarding RAID arrays are provided in, for instance, Brady et al., U.S. Pat. No. 5,727,144, entitled "Failure Prediction For Disk Arrays," issued on Mar. 10, 1998, and Menon et al., U.S. Pat. No. 5,301,297, entitled "Method And Means For Managing RAID 5 DASD Arrays Having RAID DASD Arrays As Logical Devices Thereof," issued on Apr. 5, 1994, each of which is hereby incorporated herein by reference in its entirety.

Figure 1A:
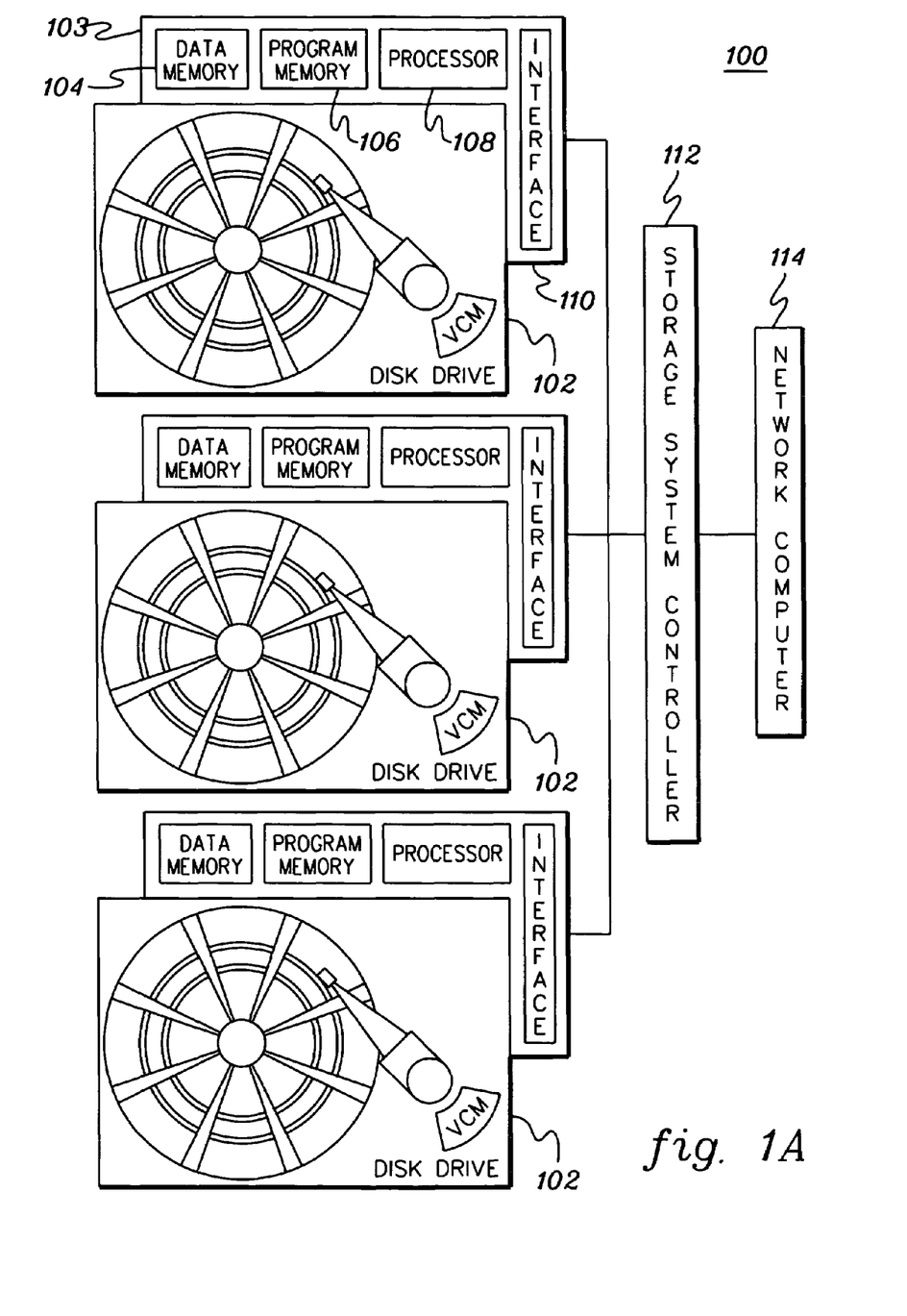
FIG. 1a depicts one embodiment of a storage system incorporating and using one or more aspects of the present invention.

A storage system includes a plurality of storage devices configured, for instance, in one of several RAID configurations to provide data storage solutions. One example of a storage system incorporating and using one or more aspects of the present invention is depicted in FIG. 1a. A storage system 100 includes, for instance, a plurality of storage devices 102, such as a plurality of hard disk drives. A storage device includes an electronics card 103 having, for instance, a data memory 104 for storing data, such as program results; a program memory 106 for storing programs to be executed to capture system parameters; a processor 108, such as a Texas Instruments TMS320 C62X or TMS320 C67X digital signal processor, for executing the programs stored in program memory; and an interface 110 (e.g., a SCSI interface) to facilitate communications between the device and a storage system controller 112.

Figure 1B:
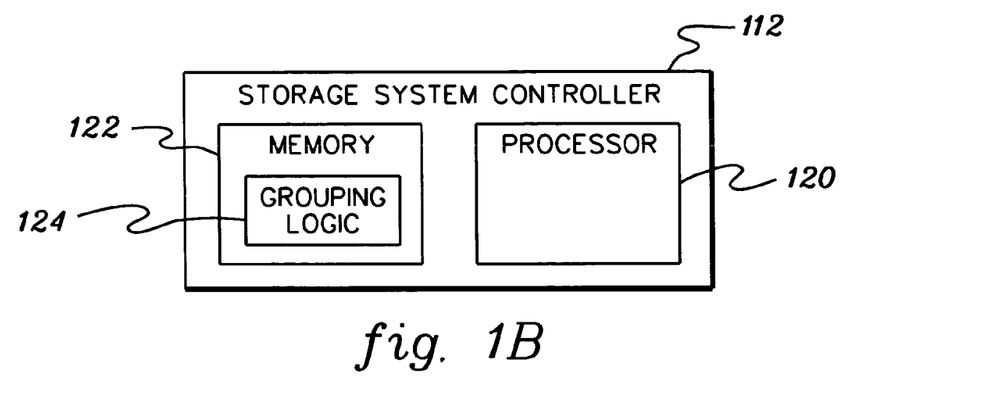
FIG. 1b depicts further details of a storage system controller of the storage system of FIG. 1a, in accordance with an aspect of the present invention.

Storage system controller 112 is responsible for writing data to and reading data from the storage devices. In one example, storage system controller 112 includes a processor 120 (FIG. 1b), such as an Intel Pentium general purpose processor, for executing programs and logic stored in a memory 122. As one example, memory 122 includes grouping logic 124 which is used in accordance with an aspect of the present invention to group storage media into one or more groups of media based on information obtained regarding the media. Storage system controller 112 is further coupled to one or more network computers 114 (FIG. 1a), such as an IBM ISERIES MODEL 800 server or INTELLISTATION Z PRO PC, that stores data on and retrieves data from the storage devices.

In accordance with an aspect of the present invention, a plurality (e.g., all or a subset) of the storage media of the storage system are grouped into one or more groups of media. In one example, these groups are physical arrays which are further grouped into logical arrays, examples of which are RAID arrays. One embodiment of the logic associated with grouping storage media into one or more groups is described with reference to FIG. 2.

Figure 2:
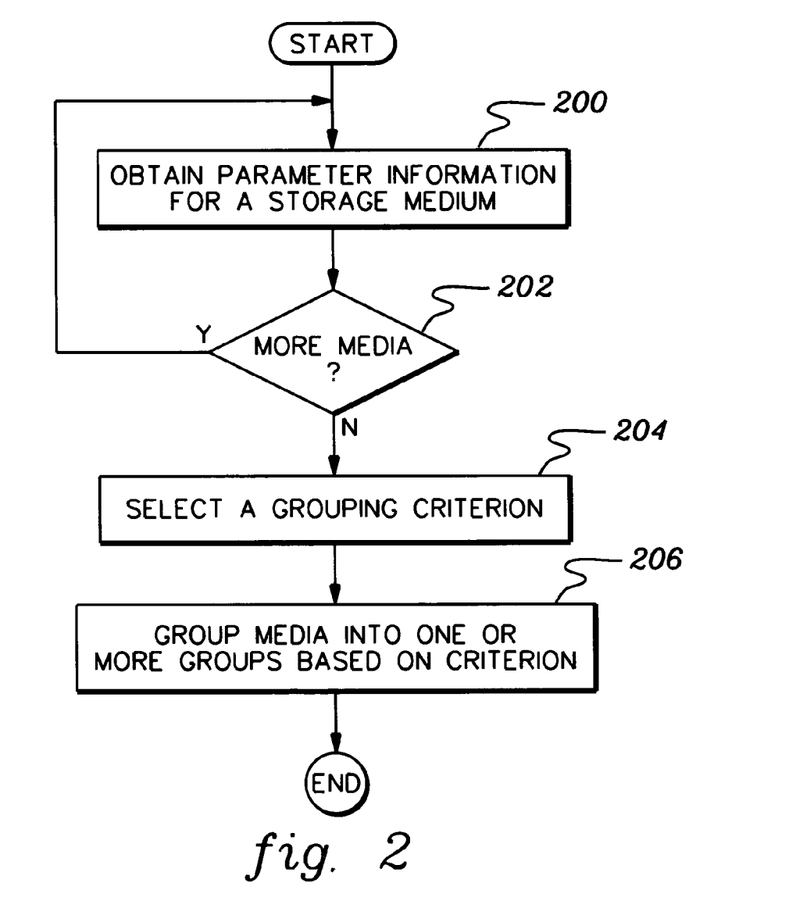
FIG. 2 depicts one embodiment of the logic associated with grouping media into one or more groups based on parameters associated with the media, in accordance with an aspect of the present invention.

Initially, parameter information is obtained for a storage medium (e.g., a storage device, such as a disk drive) of the storage system, STEP 200. This parameter information includes, for instance, measurements taken for one or more parameters associated with an individual storage device and/or it includes data obtained or provided regarding the device. Further details regarding various parameters are described below.

As one example, the parameters are categorized into five categories including, for instance, location, servo, operation, environmental and parametrics. Each of these categories is described with reference to one example of a storage device, which is a disk drive. Description of each category may vary for other types of devices. Further, there can be other categories, and/or a category may have more, less or different parameters associated therewith.

(1) Location provides a history of the residence time of the head as a function of cylinder for each drive in the system.
(2) The servo parameters provide information on servo errors which occur during operation. This information includes faults that occur in detecting the servo signal including, for instance, no servo interrupt, which indicates one or more expected servo fields were not detected; servo unlock, which indicates that several consecutive no servo interrupts have occurred; write inhibit which indicates that the servo has reported the head is off track, and therefore, the drive should not write data; and a seek time error, which indicates the seek to a track was not completed within an expected time limit. In addition, the seek time performance can be measured.
(3) The operation commands provide information about drive functions including, for instance, the workload given by operations/sec, defective sectors, head sweep operations and load/unload events. For load/unload events, disk drives with load/unload ramps unload the heads from the disk surface when the drive is powered off. During startup, the system loads the heads onto the disk by issuing a load command. In the event that the servo system loses lock and is unable to identify its track location, the disk drive processor may issue a load command to reinitialize the system. During a servo unlock, the location of the actuator which positions the head is unknown and in certain circumstances the actuator may have performed an uncontrolled seek which could damage the head or disk. A measure of how often this situation occurs can be determined by logging the number of load commands and unload commands and calculating a difference between them. The difference can be used as a measure of probable damage and/or failing operation.
(4) Environmental conditions of the hard disk drive including, for instance, shock events, vibration, temperature and humidity.
(5) Drive parametrics which provide information on the state of the internal drive components including, for instance, head flyheight; non-repeatable runout (NRRO) of the head to track motion, which provides information about the spindle bearing performance and other mechanical components; repeatable runout (RRO) of the head to track motion, which provides information on disk slip after manufacture and other repeatable forces on the actuator; data disk defects; thermal asperities; read head amplitude; and resolution and read head error rates.

These parameters can be measured initially when the drives are put into the storage system. At the time of manufacture of the drive, a number of these parameters are measured and may be stored in a reserved area of the disk to be used at the time of manufacture. Environmental conditions during shipment may also be taken and used in the initial configuration.

There are various ways in which the parameter information is obtained. In one example, the parameter information is obtained via a storage device monitor program residing in program memory 106 (FIG. 1a). The program is executed by processor 108, which captures and stores a set of disk drive parameters into memory 104 (e.g., a data buffer). The monitor program records a predetermined set of parameters, while it is receiving and executing commands from system controller 112 through drive interface 110. For example, when an error or event occurs, a flag is set, the error or event is captured by the processor and the processor logs the error or event. While many of the parameters are recorded during the normal operation of the drive, a subset of parameters, such as Flyheight, non-repeatable runout (NRRO) and repeatable runout (RRO), are performed by halting the normal drive operation and executing those parametric measurements, which takes several seconds. When memory 104 approaches a filled state, the data is written from the memory to a reserved area on the disk drive not used for data storage, which includes one or more data tracks. The data stored on the reserved data tracks is retrieved at predetermined intervals (e.g., each 12 hours) by the storage system controller through the drive interface and sent to computer 114 on the network for subsequent data processing. In this manner, the parameters are monitored with minimal interference with the normal operation of the storage system controller.

In another example, a known technology, referred to as Self-Monitoring Analysis and Reporting Technology (SMART) may be used to obtain data regarding various parameters. SMART is described in an article entitled, "Self-Monitoring Analysis and Reporting Technology," by Charles M. Kozrerok, The PC Guide (http://www.PCGuide.com), Apr. 17, 2001, which is hereby incorporated herein by reference in its entirety. This article is not only available on the internet, but is also available by purchasing a CD-Rom through www.PCGuide.com. In this example, storage system 112 interrogates the disk drive by sending a command to the disk drive, the drive then returns the value of the requested parameter which is stored in storage system controller memory 122.

Other details regarding obtaining parameter information are provided in Brady et al., U.S. Pat. No. 5,727,144, entitled "Failure Prediction For Disk Arrays," issued on Mar. 10, 1998, which is hereby incorporated herein by reference in its entirety.

Returning to FIG. 2, subsequent to obtaining the parameter information for the storage medium, a determination is made as to whether there are more media for which parameter information is to be obtained, INQUIRY 202. If there are more media, then processing continues with STEP 200. Otherwise, a grouping criterion is selected, STEP 204. Examples of grouping criterion include, for instance, grouping based on performance, reliability, a combination of both and/or other criteria. The selected grouping criterion is indicated to the storage controller, which in the embodiments described herein, has the responsibility for performing the grouping. For example, the storage controller includes the grouping logic.

Thereafter, the media are grouped into one or more groups based on the criterion and the obtained information, STEP 206. In one example, the media are grouped into groups by identifying to the storage controller the media that are a part of a particular group. This identification is stored, for instance, in memory 122 of the storage controller. The number of media in each group may depend on a variety of factors including, for instance, how many media there are; the desired number of media in each group; and/or the resultant RAID level to be configured using the groups. Other examples also exist.

There are numerous ways in which the parameter information can be used for grouping of media into groups, such as physical arrays. Two examples include grouping based on performance and grouping based on reliability. Each of these examples is described in further detail below.

Storage media may be grouped into one or more groups based on individual performance measurements. The performance, reliability and availability of data stored in a physical array is dependent upon the individual performance of the storage devices deployed in the array. Thus, to optimize the overall storage system, performance information (e.g., measurement data) is obtained for each individual storage device to be deployed in the system and is used to assign the device into a group. As one example, storage devices, such as disk drives, may be assigned to physical arrays based on individual drive performance measurements. Performance of an individual disk drive depends, for instance, upon the average access time, which includes the seek and latency of a particular drive, as well as the frequency of drive errors, which result in the drive failing to execute a command on the first attempt or repeated attempts. Such command errors include, for instance, write inhibits, no servo interrupt, servo unlock, and seek time out, all of which degrade performance objectives. Each of these parameters, therefore, can be measured and used to quantify the performance of a particular hard disk drive. A rate for each of these parameters may be determined by dividing the number of errors by the number of operations in a prespecified time interval (e.g., one hour). The rate may be dependent on the absolute number of operations/second the drive is executing.

Figure 3:
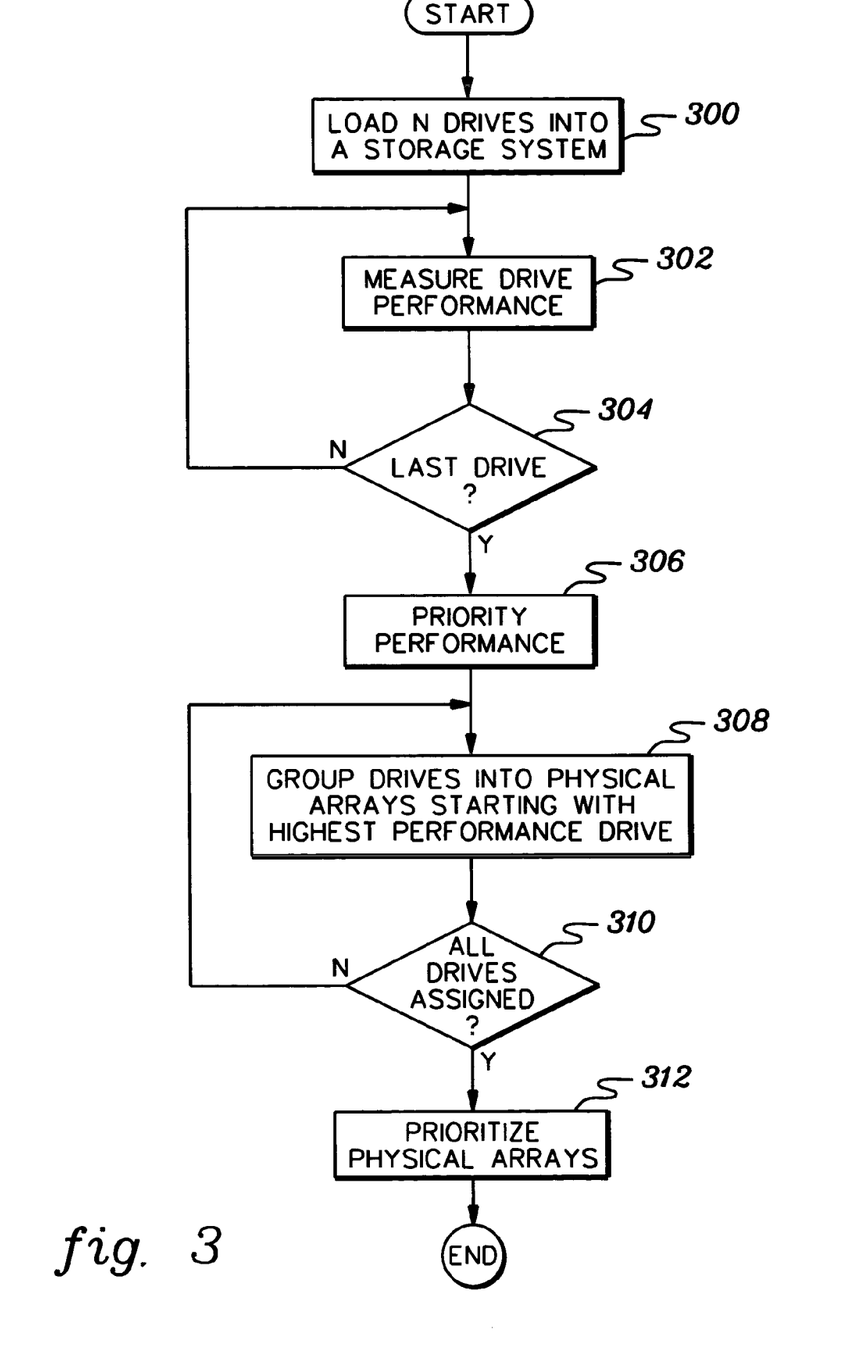
FIG. 3 depicts one embodiment of the logic associated with grouping drives into physical arrays based on performance, in accordance with an aspect of the present invention.

One embodiment of the logic associated with grouping storage media based on performance is described with reference to FIG. 3. In this example, the storage media includes storage devices, such as disk drives. However, this is only one example. Other media may also be grouped, in accordance with an aspect of the present invention.

Initially, a desired number of drives is loaded into the storage system, STEP 300. Then, a drive is selected and the performance of that drive is obtained, STEP 302. For example, the performance of the drive is measured. An example of determining a performance metric using various performance parameters includes the following:

$$\text{Performance Metric} = \text{Avg Seek Time} + \text{Avg Latency} + a \times \text{Write Inhibit Rate} \times (\text{Avg Latency}) + b \times \text{No Servo Interrupt Rate} \times (\text{Avg Latency}) + c \times \text{Servo Unlock Rate} \times (\text{Avg Seek Time} + \text{Avg Latency}) + d \times \text{Seek Time Out Rate} \times (\text{Time Out Interval} + \text{Avg Seek Time} + \text{Avg Latency}),$$

Where a, b, c, d are weighting factors and have a value in any relative range, such as, for instance, from 0 to 1 or 0 to 100; seek time is a provided value; and the rates are determined, as described above.

An example of some typical drive parameters include, for instance:

Rotational Speed 7,200 RPM
Read Seek Time (Average) 8.9 ms
Write Seek Time (Average) 10.9 ms (average)
Track-To-Track Seek Time 2.0 ms (average)
Full Stroke Seek 21.0 ms (average)
Average Latency 4.2 ms.

Further, an example of some drive error rates include, for instance:

Write Inhibit Rate=0.1
No Servo Interrupt Rate=0.01
Servo Unlock Rate=0.25
Seek Time Out Rate=0.01.

The above metric is only one example. Many combinations of parameters or even a single parameter may be used in creating a performance metric for the drive. Other performance metrics may include more, less and/or different parameters.

Subsequent to obtaining a performance metric for the drive, a determination is made as to whether this is the last drive in which measurements are to be obtained (e.g., the last drive of the loaded drives or the last drive of a subset of the drives, as desired), INQUIRY 304. If it is not the last drive for which measurements are to be obtained, then processing continues with STEP 302. However, if it is the last drive, then the drives are prioritized based upon drive performance, STEP 306.

Thereafter, in one example, the drives are grouped into groups (e.g., physical arrays) starting with, for instance, the highest performance drive, STEP 308. A decision is made as to whether all the drives to be assigned have been assigned to an array, INQUIRY 310. If all the drives have not been assigned, then processing continues with STEP 308. Otherwise, processing continues with STEP 312. At STEP 312, the physical arrays are prioritized. This allows the identification and selection of those arrays with the highest performance. Thus, if a logical array (e.g., a RAID array) is to be configured based on performance, then the physical arrays with the highest priority are selected first. A logical array can correspond to one physical array, or it can be formed by splitting or combining physical arrays, depending on the desired RAID level.

Additionally, in one example, the storage system is notified of which arrays have the highest performing drives and data which is most frequently accessed is loaded onto those arrays. The storage system can autonomically determine which data is more frequently accessed and reallocate the data to arrays with the best performance, as described herein.

In a further example, grouping of the storage media may be based upon the reliability of each medium to minimize the probability of data loss for a storage system. One way to represent the reliability is to use the probability of having no failure within a certain length of time. The reliability of a system is a function of the reliability of its components. For example, for a system without redundancy, data loss occurs when at least one medium fails. In this case, the reliability of a system with N components having the reliability of $p_1$, $p_2, \ldots, p_N$ is the product of the component reliability:

$$R_1 = p_1 p_2 \ldots p_N.$$

This system reliability is smaller than the reliability of each component, and decreases as more components are added. For a system that loses data only if two or more media fails within a certain time period, the system reliability is:

$$R_2 = R_1 + R_1[(1-p_1)/p_1 + (1-p_2)/p_2 + \ldots + (1-p_N)/p_N].$$

Similarly, the reliability of a system having more than two media can be obtained as a function of the components reliabilities. Hence, if the component reliabilities are predicted, the system reliability can also be predicted.

Given failure occurrence data, the component reliability can be predicted based on the monitored parameters that are measured from the component or the system. There can be a number of parameters that may be related to the reliability. The potential relationship can be assessed based on data. Then, a statistical modeling produces a prediction equation that relates the component reliability to the relevant parameters.

For an example of a storage medium, such as a disk drive, many parameters may be considered to be related to the component reliability. Examples are NRRO on multiple surfaces; the flyheight of each head to determine the margin of operation; and the thermal asperity rate for each surface. Operating parameters such as, for instance, write inhibits, servo unlocks, and/or load/unload events may be related to storage media reliability. For example, the NRRO of head to track motion may vary from surface to surface, e.g., the highest NRRO of the head to track motion occurs on the disk surface within a disk stack which is located nearest the spindle bearing with the highest mechanical bearing NRRO. In yet another example, the NRRO of the head to track motion may be analyzed in the frequency domain to provide information on individual mechanical components in the disk drive. Particular frequencies in the head to track NRRO frequency spectrum can be identified as due to, for example, motor spindle bearings, head suspension resonances, baseplate resonances, etc.

Environmental factors and the usage/activity patterns may also be useful in modeling and predicting the component reliability. Shock events and temperature readings are examples of the environmental parameters that can be monitored. The frequency or rate of the commands, as well as the cumulative times the drive accesses a head and cylinder, provides a history of the pattern usage. Such cumulative times may also include the total time a head spends flying on individual data cylinders, or the number of write cycles the head performed on individual data cylinders. These parameters are included in the statistical reliability modeling, and can be incorporated into the prediction equation.

Figure 4:
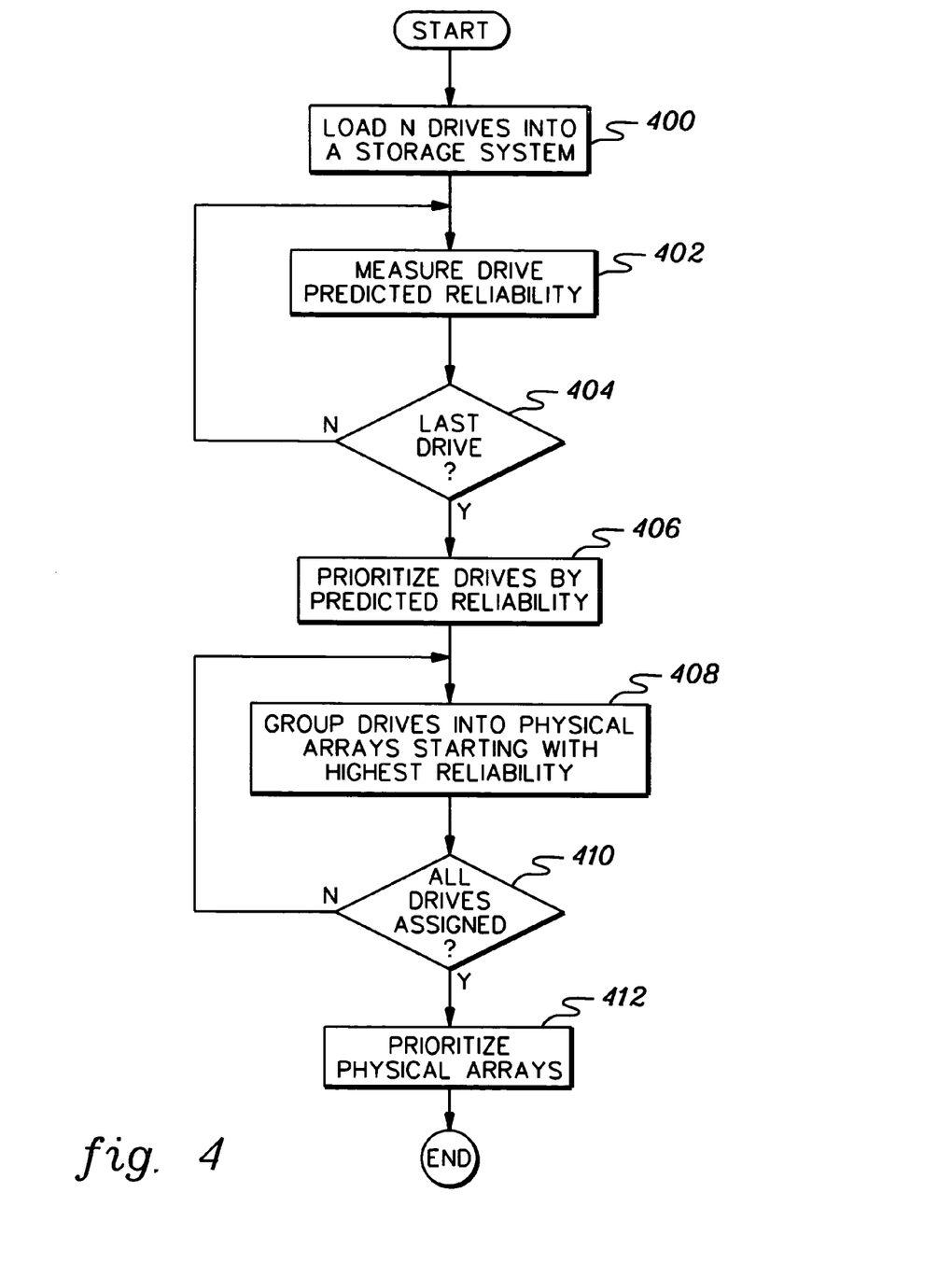
FIG. 4 depicts one embodiment of the logic associated with grouping drives into physical arrays based on reliability, in accordance with an aspect of the present invention.

One embodiment of the logic associated with grouping storage media based on reliability is described with reference to FIG. 4. Again, this example is described with reference to storage devices, such as disk drives, but this is only one example.

Initially, a desired number of drives are loaded into the storage system, STEP 400, and one or more parameters of each drive are measured and monitored. The parameters are then used in a prediction equation to obtain the predicted reliabilities of the drives, STEP 402.

One example of a prediction equation expresses the natural logarithm of the reliability odds (where odds is defined as the reliability over 1–reliability) as a linear function of the parameters. For the component reliability in a specified length of time, the parameter values prior to that time period can be used as in:

Log reliability odds=$a$×(NRRO−(10% of Track Pitch))+$b$(Nominal Flyheight−Measured Flyheight)+$c$×Thermal Asperity Rate+$d$×Write Inhibit Rate+$e$×Servo Unlock Rate+$f$×(Load events−Unload events)+$g$.

Here, the coefficients (including the additional constant g) are real numbers estimated from the data using, for example, statistical logistic regression analysis. One example of statistical logistic regression analysis is described in "Applied Logistic Regression," by David W. Hosmer and Stanely Lemeshow, 2000, J. Wiley, which is hereby incorporated herein by reference in its entirety.

The above metric is only one example. Many different combinations of parameters, even a single parameter, or forms of the above equation may be used in creating a metric of predicted reliability. Other reliability metrics may include more, less and/or different parameters than those described above. For example, environmental conditions and/or usage patterns may be considered. Other examples also exist.

Subsequent to obtaining a reliability metric for the drive, a determination is made as to whether this is the last drive for which measurements are to be obtained (e.g., the last drive of the loaded drives or the last drive of a subset of the drives, as desired), INQUIRY 404. If it is not the last drive for which measurements are to be obtained, then processing continues with STEP 402. However, if it is the last drive, then the drives are prioritized based upon drive reliability, STEP 406.

Thereafter, in one example, the drives are grouped into one or more groups, such as physical arrays, starting with the highest reliability drive, STEP 408. A decision is made as to whether all the drives to be assigned have been assigned to a group, INQUIRY 410. If all the drives have not been assigned, then processing continues with STEP 408. Otherwise, processing continues with STEP 412. At STEP 412, the groups or physical arrays are prioritized. This allows the identification and selection of those arrays with the highest reliability. Thus, if a RAID array is to be built based on reliability, then the physical arrays with the highest priority are selected first.

In one example, the storage system is notified which arrays have the highest reliability, and then data which is most critical is loaded onto the arrays with the highest reliability. Further, in one embodiment, periodically, reconfiguration takes place to move data from less reliable arrays to more reliable arrays, as described below.

Other grouping techniques are possible. For example, a technique may be provided that spreads low reliability drives across arrays, so that one array is, for instance, a 50/50 mix of high reliability and low reliability drives. In that way, arrays will not be configured of 100% low reliability drives. Alternatively, the system can configure arrays with 100% reliable drives for critical data and 100% low reliable drives for non-critical data. Other percentages may also be used in combination with identifying critical data. For drives of low reliability, the system could recommend scheduled replacement and/or could implement write verify as an added reliability measure for drives of very low reliability.

A write verify operation is used, for instance, if a metric of a disk drive reaches a preset limit, since it is possible that the drive may be approaching a failure limit. To further verify the state of the drive, the system controller requests that the drive perform a write verify operation which means that after data is written it is then read back and compared to the written data to be sure the system has recorded the information correctly. Typically, this is not done during normal operation due to the time penalty. However, if the drive reliability metric has reached a preset limit, this allows the system to provide further data safety by verifying that the data is written correctly, and also to obtain further information on system failures by detecting write failures. Other corrective actions may also be taken when predictions of reliability reach preset limits, such as in the case of a high NRRO on a particular surface, the system may choose to write data to other better performing surfaces. Also for head to disk interactions indicated by thermal asperities, the system can increase the rate of disk sweeps to attempt improvement. In a further example, if another preset limit is exceeded, the system controller can notify the operator to replace a disk drive.

In yet another grouping technique, some media may be grouped based upon one criteria, such as performance, while another set of media is grouped based upon another criteria, such as reliability. Moreover, other criteria may be used.

As a further example, arrays can be produced which optimize either one of the performance or reliability attributes. Then, data which is frequently accessed is stored on the high performance drives of the array and data which is critical is stored on the high reliability drives of the array. As yet a further example, a configuration may be selected based upon the drive measurements. For example, low reliability drives may be put into a RAID 50 configuration to provide an extra level of data reliability and a high reliability drive may be used in a RAID 5 configuration.

Figure 5:
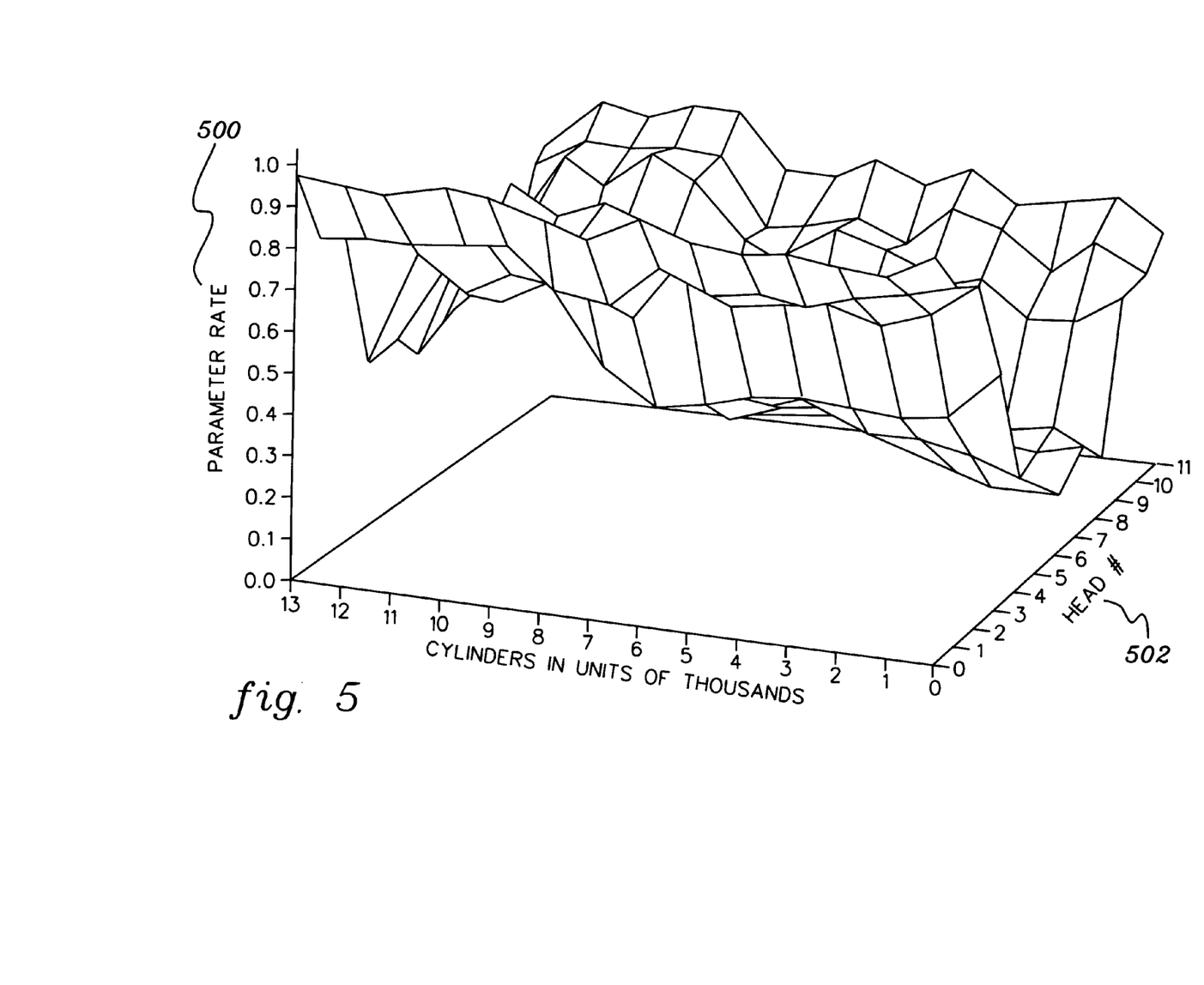
FIG. 5 depicts one example of write inhibit rates varying based on data recording surface, as used in accordance with an aspect of the present invention.

In a further aspect of the present invention, since there are significant variations within a disk drive itself (see FIG. 5), it is further possible to optimize the storage system based on the recording surfaces of the disk drives. As shown in FIG. 5, the write inhibit rate 500 for this particular disk drive is dependent upon the data recording surface 502. For example, the write inhibit rate is much higher on certain recording surfaces, for example, head numbers 0 and 11. Thus, by measuring the performance or reliability on each recording surface of a disk drive, it is possible to select individual surfaces within the storage system to group into physical arrays. This would address the surface to surface variations observed in a drive.

Figure 6:
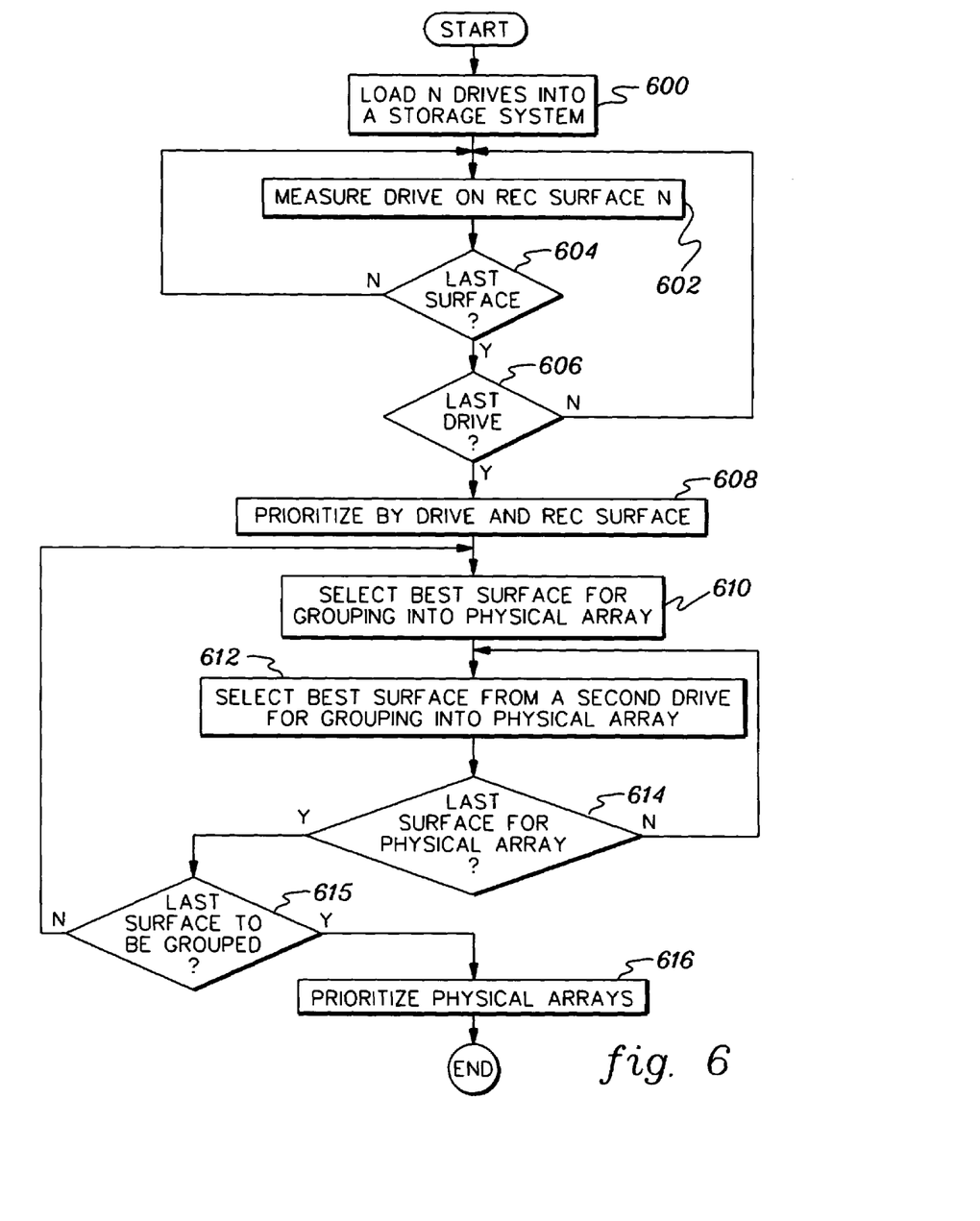
FIG. 6 depicts one embodiment of the logic associated with grouping surfaces of disk drives into groups, in accordance with an aspect of the present invention.

One embodiment of the logic associated with the grouping of individual surfaces of disk drives is described with reference to FIG. 6. Again, surfaces of disk drives is only one example. Grouping of surfaces of other media is also possible and considered within the scope of the present invention.

Initially, a number of drives is loaded into the storage system, STEP 600. Then, a recording surface on one of the drives is selected and parameter information (e.g., measurements) for that surface is obtained, STEP 602. The measurements to be obtained are based, for instance, on the criteria being used for the grouping (e.g., performance, reliability, and/or other criteria), and the manner in which these measurements are taken is similar to that described above.

Thereafter, a determination is made as to whether this is the last surface of the selected drive, INQUIRY 604. If this is not the last surface on the drive, then processing continues with STEP 602. Otherwise, a further determination is made as to whether this is the last drive for which parameter information is to be obtained, (e.g., last drive of the loaded drives or last drive of a subset of drives, as desired), STEP 606. If this is not the last drive, then processing continues with STEP 602. Otherwise, processing continues with STEP 608. At STEP 608, prioritization by drive and recording surface is performed. This includes, for instance, providing a list of surfaces with an indication of their corresponding drives in priority based on the selected criteria.

Thereafter, the best surface is selected and grouped into a group (e.g., physical array), STEP 610. Then, the best surface from the second best drive is selected for grouping into the physical array, STEP 612. Subsequently, a determination is made as to whether this is the last surface for this physical array, INQUIRY 614. This is dependent on, for instance, the desired number of surfaces to be included in an array. If not, then processing continues with STEP 612. If, however, this is the last surface for this array, then processing continues with a further determination as to whether this is the last surface to be grouped, INQUIRY 615. If there are more surfaces to be grouped, then processing continues with STEP 610. Otherwise, processing continues by prioritizing the physical arrays, STEP 616.

In accordance with a further aspect of the present invention, measurement data for the storage media (e.g., drives, surfaces, etc.) may be obtained periodically to recheck the performance, reliability and/or other metrics. Then, if a medium has changed from its initial criteria (e.g., a low performing medium is in a high performance array, a low reliability medium in a highly reliable array, etc.), reassignment can occur. One embodiment of the logic associated with reassigning or reconfiguring storage media is described with reference to FIG. 7.

Figure 7:
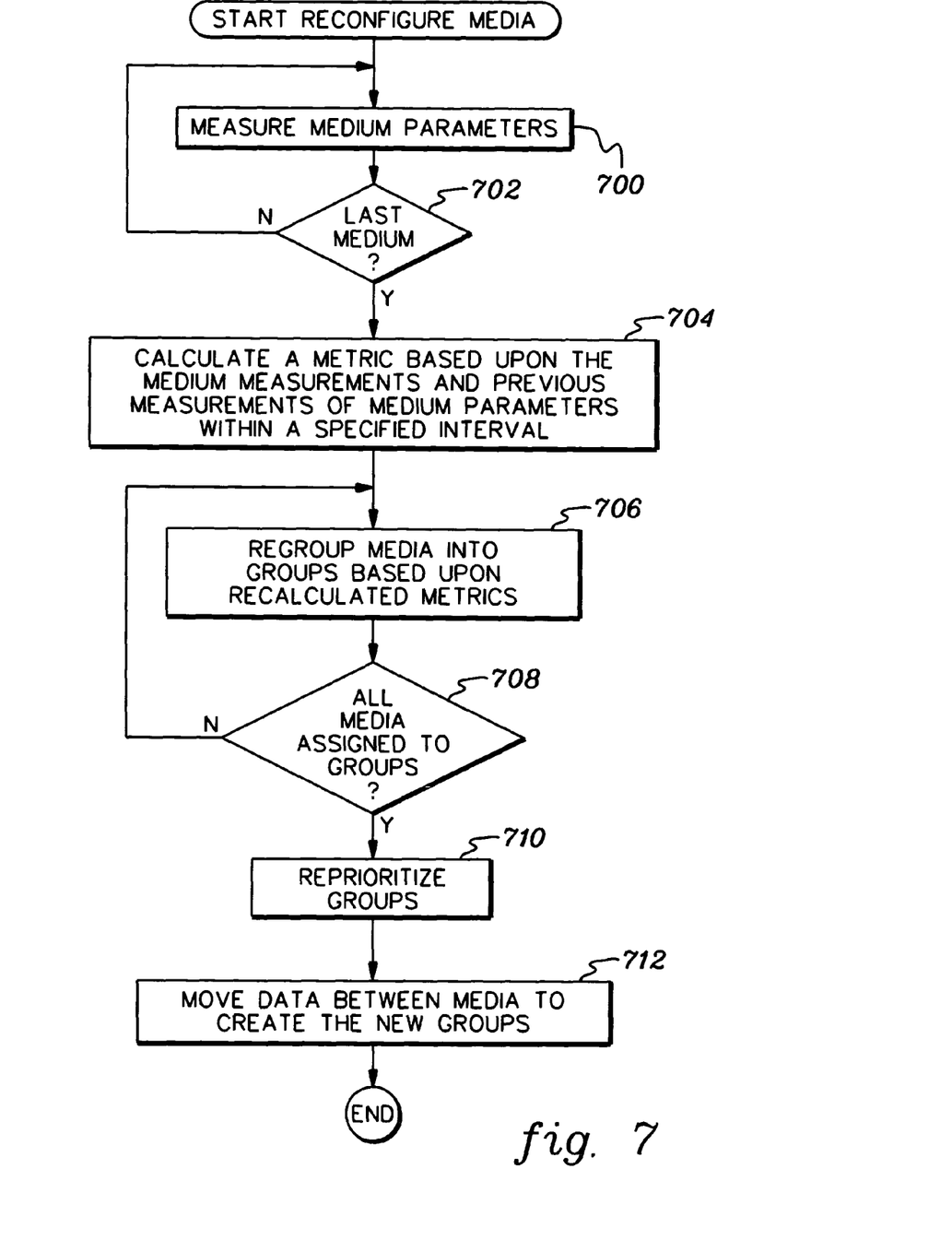
FIG. 7 depicts one embodiment of the logic associated with reconfiguring groups of storage media, in accordance with an aspect of the present invention.

Initially, a storage medium is selected and one or more parameters for that medium are obtained, STEP 700. The parameters to be measured are dependent, for instance, on the grouping criteria being selected. Thereafter, a determination is made as to whether this is the last storage medium for which measurements are to be obtained, INQUIRY 702. If not, processing continues with STEP 700. Otherwise, processing continues with STEP 704.

At STEP 704, a storage medium metric is calculated. This metric includes the storage medium measurements obtained in STEP 700, as well as the previously obtained measurements within a specified interval (e.g., one hour, one week, etc.), STEP 704. As examples, the metric is calculated by adding the measurements, or in another example, by using a weighted sum that places more emphasis on, for instance, the recent measurements. Thereafter, the media are regrouped into one or more different groups based on the recalculated metric, assuming regrouping is necessary or desired based upon the recalculated storage medium metric, STEP 706. This regrouping includes, for instance, providing the storage controller with updated identifications of the storage media in the different groups.

Subsequently, a determination is made as to whether all of the storage media have been assigned to a group, INQUIRY 708. If all the media have not been assigned to a group, then processing continues with STEP 706. However, once the media have been assigned, a reprioritization of the groups is performed, STEP 710. Again, this is assuming that regrouping is performed. Data is then moved between storage media to create the new groups, if needed, STEP 712. In one example, this moving includes having the storage controller read the data from one medium and write it to another medium. A temporary storage medium can be used to store the data, while the data is moved between media.

In a further aspect of the present invention, data between the storage media (e.g., drives, surfaces, etc.) can also be reconfigured. One embodiment of this reconfiguration is described with reference to FIG. 8. Initially, a RAID array is selected and the access frequency of data files in the selected array over a specified time interval (e.g., one hour, one week, etc.) is obtained, STEP 800. In one example, this is obtained by logging how often the system controller requests to read or write a particular data file.

Figure 8:
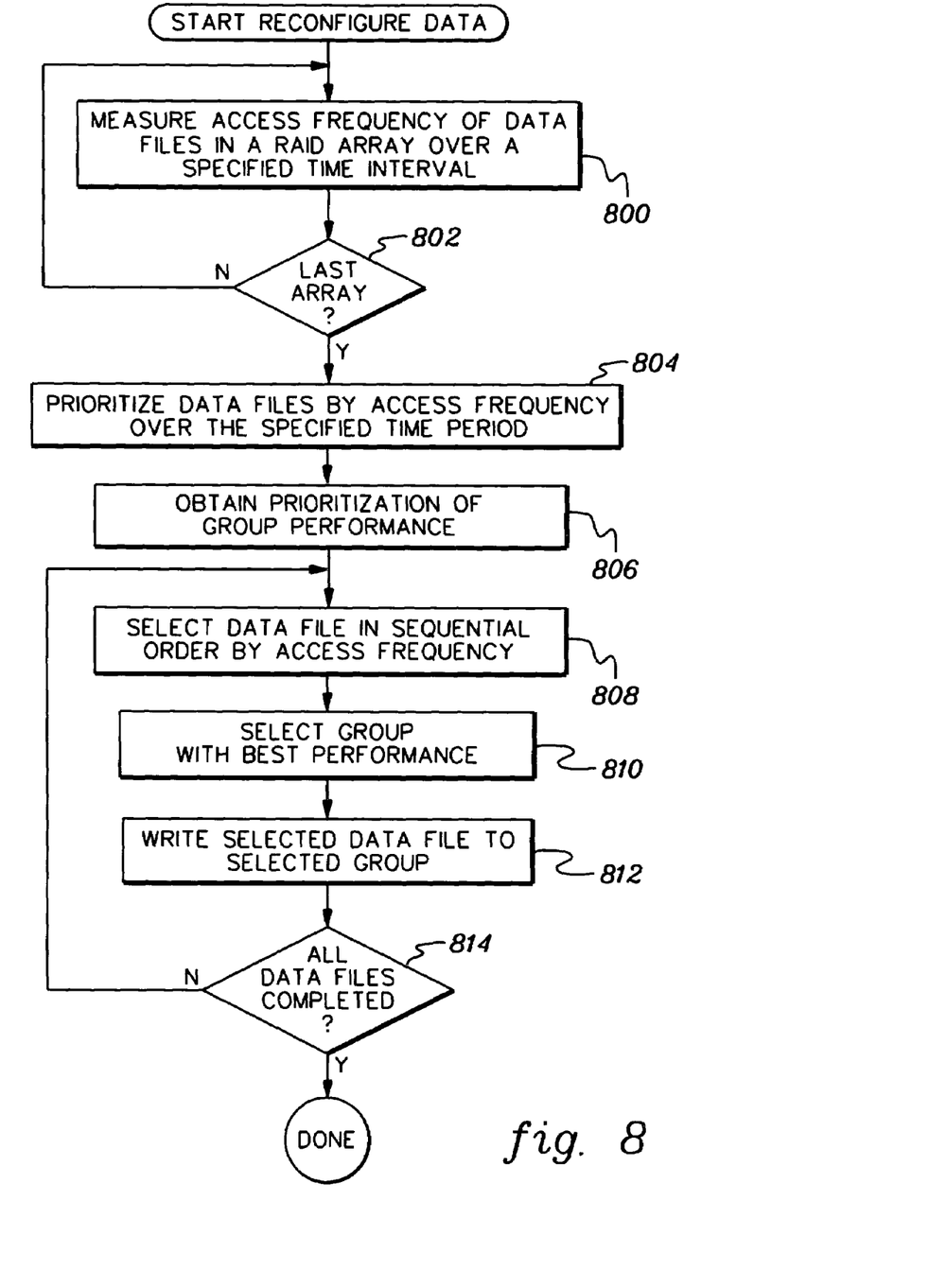
FIG. 8 depicts one embodiment of the logic associated with reconfiguring data, in accordance with an aspect of the present invention.

Thereafter, a determination is made as to whether this is the last array for which access frequency is to be obtained, INQUIRY 802. If this is not the last array, then the access frequency for the next array is obtained, STEP 800. However, if it is the last array, then the data files are prioritized by access frequency over the specified time period, STEP 804. Additionally, the prioritization of group performance is obtained, STEP 806. In one example, this prioritization is obtained from executing the logic of FIG. 3.

Thereafter, a data file is selected in sequential order by access frequency, STEP 808, and a group with available storage and the best prioritized performance is next selected, STEP 810. The selected data file is then written to the selected physical array, STEP 812. Subsequently, a determination is made as to whether all the desired data files have been processed, INQUIRY 814. If not, then processing continues with STEP 808. Otherwise, the reconfiguration of the data between the storage media is complete.

Described above are examples of reconfiguration. Reconfiguring may be performed, for instance, for surfaces and/or drives.

In a further aspect of the present invention, data stored on the same surface can be reconfigured based upon the performance of each individual surface and cylinder, as shown in FIG. 5 for write inhibit rate. Data which is accessed most frequently can be moved to the best performing cylinders of the disk drive. Further, moving data within cylinders and surfaces can be performed within the same drive.

Although the above reconfiguration of data is based on performance, similar logic can be employed to base the reconfiguration on other criteria, such as reliability. This is therefore considered within the scope of the present invention.

In yet a further aspect of the present invention, the storage system monitors the various parameters and keeps a history of the parameters, as well as the drive failures. This is valuable since the parameters can be statistically analyzed, and their differences can be statistically expressed in terms of the make, model, and manufacturing vintage of a disk drive. The model and manufacturing date information can also be incorporated into the performance and reliability metrics. This allows a storage system with different drive types to utilize the type information in configuring itself based on the performance and/or reliability metric.

A storage system may also include a database of drive serial numbers which can be communicated to other systems such that a shared knowledge of drive failures between systems would allow a global optimization of drive failures. This data may also be communicated to the manufacturer of the storage devices to take corrective actions.

Described in detail above is a facility for grouping storage media into one or more groups based on parameter data obtained for those storage media. As examples, the storage media can include storage devices, such as disk drives, and/or surfaces of disk drives. The groups are physical arrays which may then be configured into logical arrays, such as RAID arrays. As a further aspect of the present invention, groups and/or RAID arrays may be reconfigured and/or data on the drives may be reconfigured.

In yet a further aspect of the present invention, a knowledge of information may be captured and shared with others.

Although various examples are described above, these are only examples. Many variations to the above may be provided without departing from the spirit of the present invention. For example, storage devices other than magnetic disk drives, such as tape or optical storage devices, including holographic or phase change or magneto-optic or other non-volatile memory devices, such as Ferroelectric RAM or Magnetic RAM, may be grouped into a plurality of groups. Further, other media may be grouped. As yet another example, the grouping may be based on other than performance and/or reliability. As a further example, the physical arrays or groups may be used to build other types of logical arrays, other than RAID arrays.

In yet other examples, the storage system may be other than that described herein. For example, it may have additional, less and/or different components. The processors, as well as other components, can be other than those examples provided herein. Many other variations are possible. Additionally, the grouping logic may be included in a component other than the storage controller and/or it may be distributed across various components.

The present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

As one particular example, the steps of FIG. 2 may be performed in a different order. For example, the grouping criterion can be performed earlier, such as during the manufacturing process and written onto the disk drive reserved area for communication with the storage system thru the SCSI interface, so that the parameter information is obtained only for the selected grouping criterion. As yet a further example, in FIG. 6, the second surface to be selected may be from the same drive rather than a different drive. Many other variations are possible and are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of grouping storage media, said method comprising:
    obtaining parameter information for one or more parameters associated with a plurality of storage media;
    choosing at least one parameter of the one or more parameters as desired criteria to be used in grouping storage media, said at least one parameter being associated with at least one of performance of a storage medium and reliability of a storage medium; and
    selecting one or more storage medium of the plurality of storage media to be included in a storage media group, said one or more selected storage medium having the desired criteria.

2. The method of claim 1, wherein the storage media group comprises an array to be used in creating a logical array of media.

3. The method of claim 1, wherein the one or more parameters comprise at least one of:
    at least one parameter associated with residence time of a storage medium head as a function of storage medium cylinder;
    at least one parameter associated with one or more servo errors of a storage medium;
    at least one parameter associated with one or more environmental conditions of a storage medium; and
    at least one parameter associated with a state of one or more internal components of a storage medium.

4. The method of claim 1, wherein the one or more parameters comprise at least one parameter associated with one or more functions of a storage medium.

5. The method of claim 1, wherein said choosing further comprises choosing a parameter of at least one of manufacture information and date of manufacture.

6. The method of claim 1, further comprising reconfiguring the storage media group.

7. The method of claim 6, further comprising periodically obtaining parameter information for one or more parameters associated with the storage media group to be reconfigured, and wherein the reconfiguring is based on the periodically obtained parameter information.

8. The method of claim 1, wherein the plurality of storage media comprise a plurality of storage devices.

9. The method of claim 1, wherein the plurality of storage media comprise a plurality of surfaces of a plurality of storage devices.

10. The method of claim 9, further comprising:
    determining that at least one parameter of the one or more parameters is within a specified range; and
    eliminating use of a surface of the plurality of surfaces, in response to the determining.

11. The method of claim 1, wherein said performance of the storage medium comprises an amount of time to access data of the storage medium.

12. The method of claim 1, wherein the storage media group excludes storage media not satisfying the desired criteria.

13. A system of grouping storage media, said system comprising:
    means for obtaining parameter information for one or more parameters associated with a plurality of storage media;
    means for choosing at least one parameter of the one or more parameters as desired criteria to be used in grouping storage media, said at least one parameter being associated with at least one of performance of a storage medium and reliability of a storage medium; and
    means for selecting one or more storage medium of the plurality of storage media to be included in a storage media group, said one or more selected storage medium having the desired criteria.

14. The system of claim 13, wherein the storage media group comprises an array to be used in creating a logical array of media.

15. The system of claim 13, wherein the one or more parameters comprise at least one parameter associated with one or more of the following:
    residence time of a storage medium head as a function of storage medium cylinder;
    one or more servo errors of a storage medium;
    one or more functions of a storage medium;
    one or more environmental conditions of a storage medium; and
    a state of one or more internal components of a storage medium.

16. The system of claim 13, further comprising means for reconfiguring the storage media group.

17. The system of claim 13, wherein the plurality of storage media comprise a plurality of surfaces of a plurality of storage devices, and wherein the system further comprises:
    means for determining that at least one parameter of the one or more parameters is within a specified range; and
    means for eliminating use of a surface of the plurality of surfaces, in response to the determining.

18. The system of claim 13, wherein one or more storage media groups is provided, and the system further comprises:
    means for selecting a storage media group of the one or more storage media groups that satisfies a chosen criterion; and
    means for writing data having a selected attribute to the storage media of the selected storage media group.

19. A system of grouping storage media, said system comprising:
    parameter information for one or more parameters associated with a plurality of storage media;
    at least one parameter of the one or more parameters chosen as desired criteria to be used in grouping storage media, said at least one parameter being associated with at least one of performance of a storage medium and reliability of a storage medium; and
    a component to select one or more storage medium of the plurality of storage media to be included in a storage media group, said one or more selected storage medium having the desired criteria.

20. An article of manufacture comprising:
at least one computer usable medium having computer readable program code logic to manage grouping of storage media, the computer readable program code logic comprising:
obtain logic to obtain parameter information for one or more parameters associated with a plurality of storage media;
choose logic to choose at least one parameter of the one or more parameters as desired criteria to be used in grouping storage media, said at least one parameter being associated with at least one of performance of a storage medium and reliability of a storage medium; and
select logic to select one or more storage medium of the plurality of storage media to be included in a storage media group, said one or more selected storage medium having the desired criteria.

21. The article of manufacture of claim 20, wherein the storage media group comprises an array to be used in creating a logical array of media.

22. The article of manufacture of claim 20, wherein the one or more parameters comprise at least one parameter associated with one or more of the following:
residence time of a storage medium head as a function of storage medium cylinder;
one or more servo errors of a storage medium;
one or more functions of a storage medium;
one or more environmental conditions of a storage medium; and
a state of one or more internal components of a storage medium.

23. The article of manufacture of claim 20, further comprising reconfigure logic to reconfigure the storage media group.

24. The article of manufacture of claim 20, wherein the plurality of storage media comprise a plurality of surfaces of a plurality of storage devices, and further comprising:
determine logic to determine that at least one parameter of the one or more parameters is within a specified range; and
eliminate logic to eliminate use of a surface of the plurality of surfaces, in response to the determining.

25. The article of manufacture of claim 20, wherein one or more storage media groups is provided, and further comprising:
select logic to select a storage media group of the one or more storage media groups that satisfies a chosen criterion; and
write logic to write data having a selected attribute to the storage media of the selected storage media group.

26. A method of grouping storage media, said method comprising:
obtaining parameter information for one or more parameters associated with a plurality of storage media; and
grouping at least a portion of storage media of the plurality of storage media into one or more groups of storage media based on at least one parameter of the one or more parameters, wherein said at least one parameter is associated with performance of a storage medium, said performance comprising an amount of time to access data of the storage medium.

27. The method of claim 26, further comprising:
selecting a group of storage media of the one or more groups that satisfies a chosen criterion; and
writing data having a selected attribute to the storage media of the selected group.

28. The method of claim 27, wherein the chosen criteria is performance and the selected attribute is access frequency of a certain value.

* * * * *